United States Patent [19]

Grimaldo

[11] 4,211,103
[45] Jul. 8, 1980

[54] DOUBLE TAPER CLAMP

[75] Inventor: Samuel Grimaldo, Thousand Oaks, Calif.

[73] Assignee: American Machine & Hydraulics, Inc., Newbury Park, Calif.

[21] Appl. No.: 967,701

[22] Filed: Dec. 8, 1978

[51] Int. Cl.³ .............................................. B21D 41/02
[52] U.S. Cl. ....................................... 72/316; 269/217
[58] Field of Search ................. 72/300, 301, 302, 308, 72/309, 312, 315, 316, 318; 269/217, 234; 279/121, 122; 285/421

[56] References Cited

U.S. PATENT DOCUMENTS

| | | | |
|---|---|---|---|
| 1,935,714 | 11/1933 | Hummell | 72/316 |
| 2,438,999 | 4/1948 | Hartley et al. | 72/316 |
| 2,757,523 | 8/1956 | Schmid | 279/121 |
| 2,993,522 | 7/1961 | Temple et al. | 72/312 |
| 4,108,478 | 8/1978 | Lynch | 285/421 |

Primary Examiner—Lowell A. Larson
Attorney, Agent, or Firm—Ralph B. Pastoriza

[57] ABSTRACT

Lower and upper split collars are positioned in engagement with the lower and upper cylindrical surfaces of a pipe and these collars in turn held in lower and upper clamp members. The exterior surfaces of the split collars in engagement with the interior surfaces of the clamp members have decreasing diameters from intermediate points towards opposite ends to define oppositely directed slopes. The interior engaging walls of the clamp members with the split collars are similarly tapered. When a pulling or pushing force is exerted on the pipe between the split collars, a camming action against the exterior walls of the collars is effected by the clamps urging the collars radially inwardly to more tightly grip the pipe so that the pipe is held from axial movement in either direction.

5 Claims, 5 Drawing Figures

DOUBLE TAPER CLAMP

This invention relates generally to clamps and more particularly to a double taper pipe clamp for holding pipes subject to pushing and pulling forces in working portions of pipe into desired shapes.

BACKGROUND OF THE INVENTION

It is common practice to bend pipe and shape the ends of pipes so that they can be longitudinally connected. For example, in manufacturing automobile exhaust pipes, several bends must be made on the pipe. Moreover, it is often desirable to flare one end opening of the pipe or to provide an increased internal diameter portion along one end for a short distance for receiving the end of another pipe. All of these operations are normally carried out by hydraulic rams and shaping dies.

In the operation of flaring the end of a pipe or simply providing for an increased diameter portion along a short length at one end, an expansion die is normally utilized coupled to the end of a hydraulic ram. The pipe itself is clamped in a fixed position and the die then urged into the end of the pipe by the hydraulic ram. In a similar manner, the die is removed by simply reversing the direction of the hydraulic ram to pull the die free of the end of the shaped pipe. Both this pushing and pulling force in an axial direction of the pipe requires a very secure clamping of the pipe in position.

The type of clamps utilized in the foregoing operation most often take the form of an over-center clamp formed of lower and upper clamp members cammed together into tight engagement with a longitudinal portion of the pipe by an over-center lever and cam action. The clamping force exerted by such clamps is necessarily of a constant or fixed value determined by the camming force applied by the over-centering lever. If this fixed gripping force is not enough to hold the pipe in an end-forming operation, the pipe will simply slip longitudinally in the clamp. On the other hand, the applied force may be more than necessary to properly hold the pipe axially stationary with possible damage to the exterior portion of the pipe being clamped.

BRIEF DESCRIPTION OF THE PRESENT INVENTION

With the foregoing in mind, the present invention contemplates the provision of an improved pipe clamp particularly designed for holding a pipe against axially applied pushing or pulling forces but wherein the clamping force automatically adjusts itself to just the right amount required to restrain movement of the pipe regardless of whether the applied axial force is a push or a pull.

More particularly, in accord with the present invention, there is provided a fixed means which may include lower and upper clamp members cooperating with movable means which may take the form of split collars arranged to be sandwiched between the exterior of a pipe and the interior walls of the fixed means or clamps.

The opposing surfaces of the movable means with the fixed means are sloped relative to the longitudinal axis of the pipe in a first direction along one axial portion and in an opposite direction along a second axial portion.

With the foregoing arrangement, either a pulling or pushing of the pipe in an axial direction results in a camming action on the movable means to urge its pipe engaging surface into tighter engagement with the pipe. The greater the pulling or pushing force, the greater will be the radially inwardly directed camming force gripping the pipe so that there results an automatic adjustment of the gripping force to a value just sufficient to hold the pipe against axial movement.

As a consequence of the foregoing, not only is the clamp of this invention very easy to apply to the pipe since no overcentering force mechanism is necessary but in addition, the risk of damaging the exterior of the gripped portion of the pipe is minimized.

BRIEF DESCRIPTION OF THE DRAWINGS

A better understanding of this invention will be had by now referring to a preferred embodiment thereof as illustrated in the accompanying drawings in which.

DETAILED DESCRIPTION OF THE PREFERRED EMBODIMENT

Figure 1:
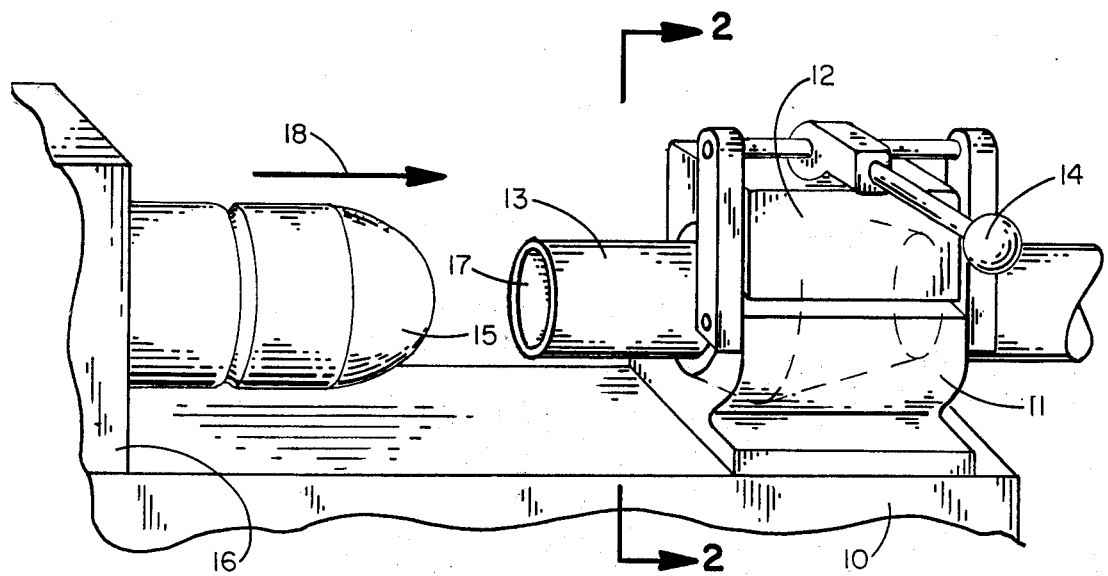
FIG. 1 is a fragmentary perspective view of the clamp of this invention securing a pipe preparatory to receiving an expanding die.

Referring first to FIG. 1, there is shown a frame portion 10 of a typical pipe working machine including the clamp of this invention. In the particular embodiment illustrated, this clamp includes a lower clamp member 11 fixedly secured to the frame 10 and an upper clamp member 12 the members 11 and 12 surrounding the lower and upper cylindrical side walls of a pipe 13. An appropriate means such as the lever handle 14 is provided for holding the upper clamp member 12 in opposed relationship to the lower clamp member 11.

Referring to the left of FIG. 1, there is shown a typical expanding die 15 secured to a hydraulic ram 16 for axial movement into the open end 17 of the pipe 13. This movement is indicated by the arrow 18, the die serving to flare out the open end of the pipe 13 to provide an increased diameter portion.

It can be appreciated that a very large axial force is exerted on the end of the pipe 13 by the die 15 under the hydraulic action and thus it is essential that the pipe 13 be appropriately held against axial movement. Moreover, when the die 15 is removed after having flared out or expanded the end of the pipe 13, a substantial pulling force is exerted on the pipe 13. The clamping structure must thus secure the pipe against both pushing and pulling forces in the particular example set forth.

Figure 2:
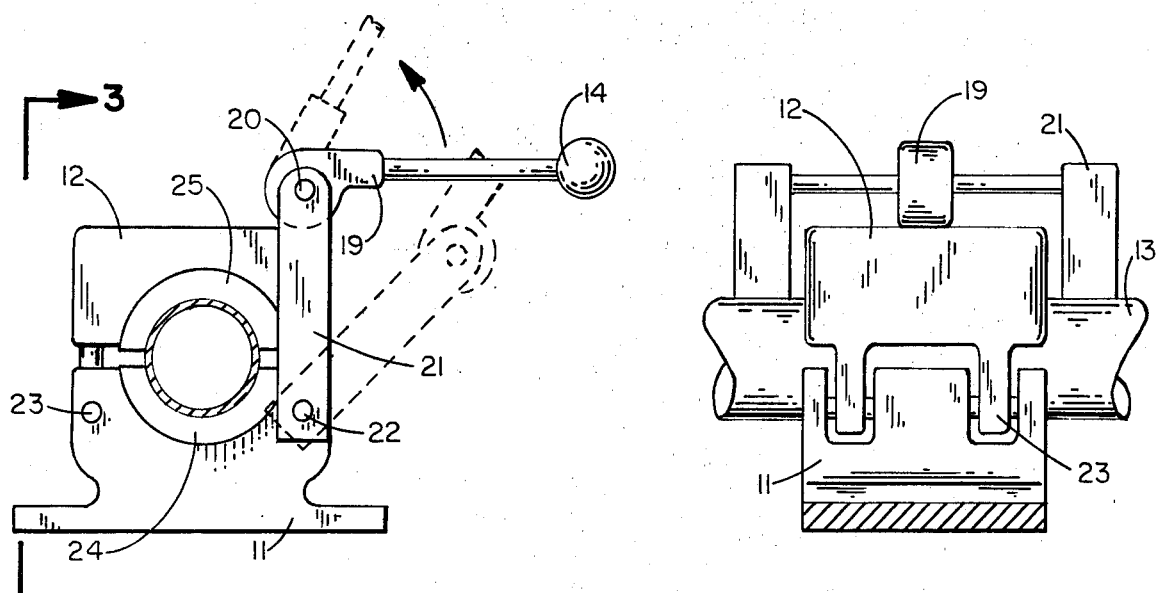
FIG. 2 is a cross section taken in the direction of the arrows 2—2 of FIG. 1.
Figure 3:
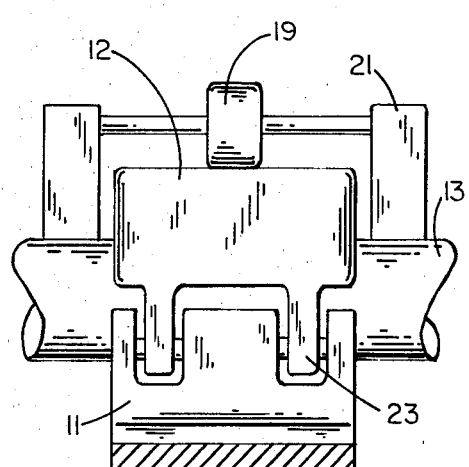
FIG. 3 is a fragmentary rear elevation of the clamp looking in the direction of the arrows 3—3 of FIG. 2.

Referring now to FIGS. 2 and 3, further details of the clamp will be evident. Essentially, the lever means 14 for holding the upper clamp member 12 in opposed relationship to the lower clamp member 11 includes an eccentric head 19 pivoted at 20 to appropriate arms such as shown at 21 in turn pivoted or hinged to the lower clamp member 11. The arrangement is such that when the lever arm 14 is swung upwardly, the eccentric pivot 20 in the head 19 results in a relaxation of camming pressure on the upper clamp member 12. When the lever 14 is in the down position illustrated in solid lines, the upper clamp member 12 is held downwardly in fixed opposing relationship to the lower clamp member 11. Complete opening of the clamp members 11 and 12 is accomplished by first shifting the lever 14 upwardly to the dotted line position and then pivoting the entire supporting arm structure about the pivot 22 thereby freeing the upper clamp member 12.

With respect to the foregoing, the rear portion of the upper clamp member 12 may be hinged to the lower clamp member 11 as at 23. This hinging arrangement 23 is best illustrated in the rear view of FIG. 3.

The foregoing overcentering type clamping or securing of the upper clamp member 12 relative to the lower clamp member 11 is entirely conventional and does not constitute part of the present invention except insofar as the structure is utilized to hold the upper clamp 12 in opposing relationship to the lower clamp 11. Actually, no downward force or pressure need be exerted by the overcenter lever but rather, this lever simply prevents upward swinging movement of the clamp member 12.

The actual clamping action in accord with the present invention is accomplished by lower and upper pipe engaging split collars sandwiched between the lower clamp member and lower pipe wall and between the upper clamp member and upper pipe wall respectively. First ends of these collars are visible in FIG. 2 at 24 and 25.

Figure 4:
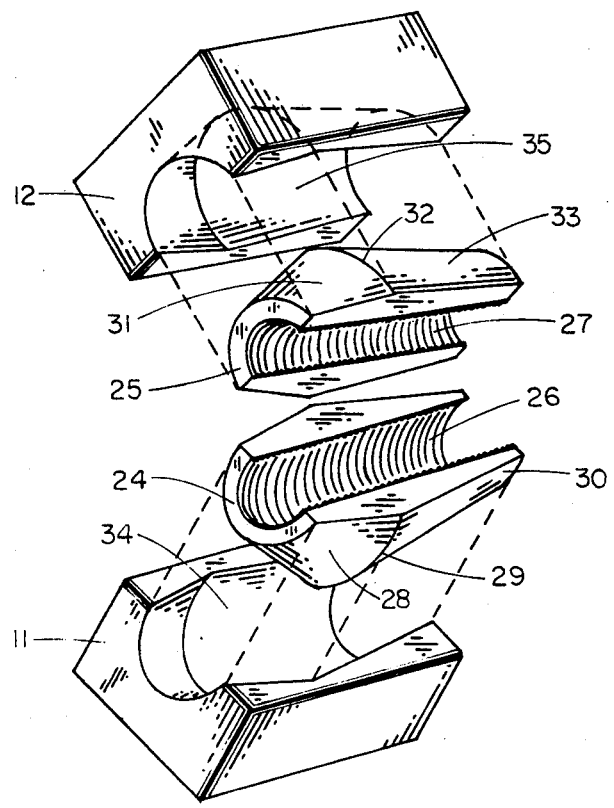
FIG. 4 is an exploded perspective view of basic components making up the clamp of FIGS. 1-3; and, FIG. 5 is a cross section through the principal clamp components useful in explaining the operation of the invention.

Referring particularly to FIG. 4, each of the split collars 24 and 25 includes a semi-cylindrical interior wall 26 and 27 respectively conforming substantially to the cylindrical wall of the pipe for engaging the same. Also, each split collar has an exterior annular surface which increases in diameter in an axial direction from one end to an intermediate point and thence decreases in diameter towards its opposite end to define double semi-conical tapered surfaces. Thus, the increasing diameter surface portion for the split collar 24 is shown at 28 terminating at the intermediate point 29 and thence decreasing in diameter at 30 between the intermediate point 29 and the opposite end. A similar increasing diameter surface portion is shown at 31 for the split collar 25 terminating at an intermediate point 32 and thence having a decreasing diameter portion 33 to its opposite end.

As also evident from FIG. 4, the interior wall of each clamp member has a similar semi-conical taper surface dimensioned to seat the exterior wall of the split collar received therein. Thus, the similarly shaped interior wall for the lower clamp member 11 is indicated at 34 and the similarly shaped interior wall for the upper clamp member 12 is indicated at 35.

Figure 5:
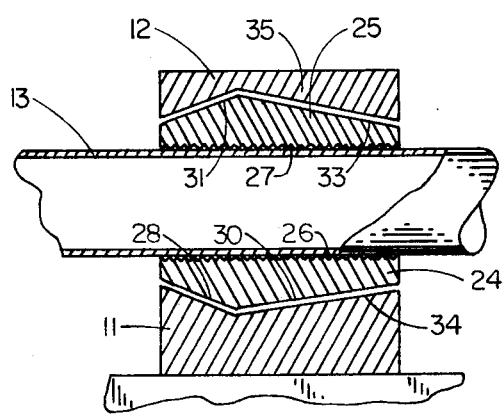

FIG. 5 shows the lower and upper split collars 24 and 25 engaged about lower and upper cylindrical portions of the pipe 13 with their double tapered exterior surfaces nesting in the similarly shaped interior wall surfaces of the lower and upper clamp members 11 and 12. There is illustrated in FIG. 5 a slight clearance between the opposed surfaces which clearance is greatly exaggerated. This clearance is merely shown to indicate that clamping force is not applied by the over-center lever 14 described in FIG. 2. Rather, this lever will simply as stated heretofore, assure that the upper clamp member 12 cannot move away from the lower clamp member 11.

With the arrangement as illustrated in FIG. 5, it will now be evident that if a pulling force is applied on the pipe 13 in an axial direction, the split collars 24 and 25 which in one sense constitute a movable means will tend to move to the left thus bringing the first tapered or conical surfaces 28 and 31 described in FIG. 4 into camming engagement with the corresponding tapered surface portions of the interior wall surfaces 34 and 35 of the lower and upper clamp members respectively. The stronger the pulling force, the greater will be the engagement between these surfaces thus camming the split collars radially inwardly to more tightly grip the pipe 13. This gripping action will increase until the pulling force necessary to remove the die 15 in the example described in FIG. 1 is reached at which point the die can then be withdrawn.

On the other hand, when the end of the pipe 13 is being radially expanded by the expanding die thus exerting a pushing force on the pipe 13, the lower and upper split collars 24 and 25 will move to the right as viewed in FIG. 5 so that their oppositely tapered exterior surfaces 30 and 33 engage the corresponding interior wall tapers of the lower and upper clamps 11 and 12. Again, there will be exerted a radially inwardly directed camming force by these opposing surfaces which force will increase with increased pushing force so that again the pipe 13 is axially held.

Whether the force is pulling or pushing, it will thus be evident that the semi-conical tapered surfaces of the split collars and lower and upper clamp members function to provide just sufficient gripping force to either release the die or enable the necessary shaping of the pipe end to be achieved. Because the gripping force is no greater than necessary, possible damage to the exterior of the pipe itself being gripped is minimized.

Finally, it will be appreciated that insertion and removal of the pipe from the clamp is very simple since it is only necessary to remove the restraining means in the form of the lever and arm structure described in FIG. 2 from the upper clamp member 12, this clamp member then simply being swung about its rear pivot 23, the split collars removed, and the pipe removed. Since the gripping force on the pipe is generated by axial movement or force applied to the pipe itself, there is not required any clamping pressure by the over center arrangement, all as described heretofore.

From all of the foregoing, it will thus be seen that the present invention has provided a very simple and yet vastly improved pipe clamp for restraining a pipe against axial movement in either direction.

In the particular embodiment illustrated and is most evident from FIGS. 4 and 5, the intermediate points 29 and 32 at which the taper reverses direction is closer to one and than the other. Normally, the pushing force in the operation of expanding the end of the pipe will be substantially greater than the pulling force necessary to remove the die after expansion. Thus, in the particular embodiment illustrated, with the intermediate point where the taper changes closer to the left end as viewed in FIG. 5 than to the right end, it will be appreciated that the engaging camming surface area is substantially greater for the pushing forces than the engaging camming surfaces areas during the pulling operation.

Moreover, in the particular embodiment illustrated the absolute magnitude of the slopes between the intermediate point and the opposite ends are equal thus simplifying the machining of the split collars. However, it is not essential that these slopes be equal.

Finally, while the double taper clamp has been described with respect to the gripping of a cylindrical pipe, the invention is clearly applicable to gripping any elongated member wherein it is desired to restrain axial movement in one direction or the other.

I claim:

1. A pipe clamp including, in combination:
   (a) fixed means surrounding at least a portion of a pipe to be clamped; and
   (b) axially movable means engaging said portion of said pipe in a position sandwiched between said fixed means and said portion of the pipe, the opposing respective exterior and interior surfaces of said movable means and fixed means being sloped relative to the longitudinal axis of said pipe in a first direction along one axial portion and in an opposite direction along a second axial portion, whereby either pulling or pushing of said pipe in an axial direction moves said movable means axially to result in a camming action on said movable means by said opposing surface of said fixed means to urge the pipe engaging portion of said movable means into tighter engagement with said pipe and thus prevent further axial movement of said pipe.

2. A pipe clamp according to claim 1, in which said movable means comprises at least one split collar wherein the sloping of its surface in engagement with said fixed means is defined by a decreasing external diameter of the split collar between an intermediate point and its opposite ends, the internal diameter of the fixed means surrounding at least a portion of said pipe, similarly decreasing in diameter between an intermediate point and its opposite ends.

3. A pipe clamp, including, in combination:
   (a) a lower clamp member for receiving a lower cylindrical side wall of a pipe to be clamped;
   (b) an upper clamp member positionable over the upper cylindrical side wall of said pipe in opposing relationship to said lower clamp member;
   (c) means for holding said upper clamp member in said opposing relationship to said lower clamp member;
   (d) lower and upper pipe engaging split collars sandwiched between the lower clamp member and lower pipe wall and between the upper clamp member and upper pipe wall respectively, each split collar having a semi-cylindrical interior wall conforming substantially to the cylindrical wall of said pipe for engaging the same, and having an exterior annular surface which increases in diameter in an axial direction from one end to an intermediate point thence decreases in diameter towards its opposite end to define double semi-conical tapered surfaces, the interior wall of each clamp member having similar semi-conical tapered surfaces seating the exterior walls of the split collars so that when a pipe is engaged by said split collars while positioned in the clamp members and an axial pull or push is applied to the pipe, the camming action of the interior semi-conical tapered surfaces of the clamp members on the exterior surfaces of the split collars urges them radially inwardly to thereby grip the pipe with increased force and prevent axial movement of said pipe out of said clamp members in either direction.

4. A pipe clamp according to claim 3, in which said intermediate point is closer to one end of the split collar than the other.

5. A pipe clamp according to claim 3, in which the absolute values of the slopes defined by the semi-conical tapered surfaces on either side of said intermediate point are equal.

* * * * *